United States Patent
Yang et al.

(10) Patent No.: US 9,252,655 B2
(45) Date of Patent: Feb. 2, 2016

(54) PHASE SHIFT CIRCUIT AND POWER FACTOR CORRECTION CIRCUIT INCLUDING THE SAME

(71) Applicants: SAMSUNG ELECTRO-MECHANICS CO., LTD., Suwon, Gyunggi-do (KR); University of Seoul Industry Cooperation Foundation, Seoul (KR)

(72) Inventors: Jeong Mo Yang, Gyunggi-do (KR); Hwan Cho, Gyunggi-do (KR); Yong Seong Roh, Incheon (KR); Young Jin Moon, Gwangju (KR); Jeong Pyo Park, Gyeonggi-do (KR); Chang Sik Yoo, Seoul (KR); Yu Jin Jang, Gyunggi-do (KR); Joong Ho Choi, Gyeonggi-do (KR)

(73) Assignees: SAMSUNG ELECTRO-MECHANICS CO., LTD., Suwon-Si, Gyeonggi-Do (KR); UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 239 days.

(21) Appl. No.: 13/861,295

(22) Filed: Apr. 11, 2013

(65) Prior Publication Data
US 2014/0176089 A1 Jun. 26, 2014

(30) Foreign Application Priority Data

Dec. 21, 2012 (KR) .......................... 10-2012-0151304

(51) Int. Cl.
*H02M 3/158* (2006.01)
*H02M 1/42* (2007.01)

(52) U.S. Cl.
CPC ............ *H02M 1/4225* (2013.01); *Y02B 70/126* (2013.01)

(58) Field of Classification Search
CPC .... Y02B 70/12; Y02B 70/123; Y02B 70/126; H02M 1/4208; H02M 1/4225; H02M 3/158; H02M 3/1582; H02M 3/1584
USPC .................................................. 323/207, 225
See application file for complete search history.

(56) References Cited

U.S. PATENT DOCUMENTS

| 5,892,352 | A | 4/1999 | Kolar et al. |
| 7,884,588 | B2 | 2/2011 | Adragna et al. |
| 2009/0206809 | A1 | 8/2009 | Koo et al. |
| 2011/0280353 | A1* | 11/2011 | Chen et al. ..................... 375/354 |
| 2012/0086411 | A1* | 4/2012 | Takacs .......................... 323/205 |

FOREIGN PATENT DOCUMENTS

| EP | 2086095 A1 | 8/2009 |
| KR | 10-2009-0088227 A | 8/2009 |

* cited by examiner

*Primary Examiner* — Adolf Berhane
*Assistant Examiner* — Yemane Mehari
(74) *Attorney, Agent, or Firm* — McDermott Will & Emery LLP

(57) ABSTRACT

A phase shift circuit may include a ramp generation unit charging or discharging a capacitor connected to a switch device to generate a ramp signal, a reference signal generation unit generating a predetermined reference signal from the ramp signal, and a comparison unit comparing the ramp signal with the reference signal to generate a clock signal, wherein at least one of the reference signal generation unit and the comparison unit changes a negative or positive value of offset components included in the reference signal or the ramp signal within every operating period of the switch device.

13 Claims, 4 Drawing Sheets

PHASE SHIFT CIRCUIT AND POWER FACTOR CORRECTION CIRCUIT INCLUDING THE SAME

CROSS-REFERENCE TO RELATED APPLICATIONS

This application claims the priority of Korean Patent Application No. 10-2012-0151304 filed on Dec. 21, 2012, in the Korean Intellectual Property Office, the disclosure of which is incorporated herein by reference.

BACKGROUND OF THE INVENTION

1. Field of the Invention

The present invention relates to a phase shift circuit capable of significantly reducing electromagnetic interference (EMI) in input and an output signals by controlling a phase difference between driving signals of switches operating a main circuit and a sub circuit included in a power factor correction circuit, and a power factor correction circuit including the same.

2. Description of the Related Art

Recently in the electrical engineering and electronics fields, research into a method of removing harmonic components occurring in an input terminal of an electronic device so as to significantly reduce an effect thereof on a power supply line of the electronic device and interference with other devices has been actively conducted. An efficient method of removing harmonic components may use a power factor correction circuit (PFC) which may be divided into a passive type power factor correction circuit or an active type power factor correction circuit, according to whether the power factor correction circuit includes a switch. The passive type power factor correction circuit has a large form factor and a reasonably small effect. As a result, active type power factor correction circuits are extensively used.

Among active type power factor correction circuits, an interleaved type power factor correction circuit using at least two same power factor correction circuits connected to each other in parallel has characteristics that depend on a phase difference between signals operating a plurality of circuits connected to each other in parallel. For example, in the case that two same power factor correction circuits are connected to each other in parallel in a master-slave scheme, driving signals for operating switches included in each of the two circuits have a phase difference of 180° with respect to each other, such that the electro-magnetic interference of the input and output signals may be significantly reduced. Provided the phase difference between the driving signals for each of the main circuit and the sub circuit is out of 180°, a ripple component of the input current is increased, such that the electromagnetic interference is also increased.

In the interleaved type power factor correction circuit, various types of phase shift circuits have been proposed to maintain the phase difference between the switch devices included in each circuit at a required value. However, the phase shift circuit according to the related art may have limited conditions upon selecting current sources included in the phase shift circuit or there may be a difficulty in generating a phase difference required by the phase shift circuit.

In the Related Art Document below, Patent Document 1 relates to an interleaved type switching converter, a control apparatus, and a method thereof and discloses a method of generating a control signal by switching a power supply using an interleaved type and keeping a phase difference of a required value, 180°. Patent Document 2 relates to a phase shift and synchronous circuit and discloses contents regarding control of sinking between control signals of each switch device in an interleaved type power factor correction circuit. However, both of Patent Documents 1 and 2 do not disclose a configuration of offsetting an overall average of offset components by changing a negative or positive value of the offset components of an input signal every period in the phase shift circuit only including a single current source.

RELATED ART DOCUMENT (Patent Document 1) Korean Patent Laid-Open Publication No. KR 10-2009-0088227
(Patent Document 2) European Patent Laid-Open Publication No. EP 2086095 A1

SUMMARY OF THE INVENTION

An aspect of the present invention provides a phase shift circuit capable of accurately controlling a phase difference by offsetting all offset components, by generating a driving signal of a switch device included in an interleaving power factor correction circuit using a phase shift circuit including a single current source and changing a negative or positive value of the offset components included in an input signal required for a phase shift circuit to generate a clock signal within a specific period, and a power factor correction circuit including the same.

According to an aspect of the present invention, there is provided a phase shift circuit, including: a ramp generation unit charging or discharging a capacitor connected to a switch device to generate a ramp signal; a reference signal generation unit generating a predetermined reference signal from the ramp signal; and a comparison unit comparing the ramp signal with the reference signal to generate a clock signal, wherein at least one of the reference signal generation unit and the comparison unit changes a negative or positive value of offset components included in the reference signal or the ramp signal within every operating period of the switch device.

The reference signal generation unit may include: a reference level detection unit detecting half of a peak value of the ramp signal; and a sample and hold circuit sampling the reference level and transferring the sampled reference level to a non-inverting terminal of the comparison unit.

At least one of the reference level detection unit and the comparison unit may change a negative or positive value of the offset components included in the reference signal or the ramp signal within every operating period of the switch device.

The operating period of the switch device may be determined by current flowing in an inductor of a power factor correction circuit operated by a clock signal output by the comparison unit.

The current flowing in the inductor may be detected by a zero point crossing method.

The comparison unit may generate the clock signal so that an average value of a turn-on time of the clock signal within one period corresponds to a half value of one period of the clock signal.

According to another aspect of the present invention, there is provided a power factor correction circuit, including: a detection circuit unit detecting current flowing in inductors included in a main circuit and a sub circuit, respectively, to generate a voltage pulse signal; a control unit operating a switch device during every period of the voltage pulse signal to charge and discharge a capacitor and generate a control signal; and a driving circuit unit determining operations of switches included in the main circuit and the sub circuit, respectively, based on the control signal and the voltage pulse signal, wherein the control unit charges and discharges the capacitor to generate a ramp signal and compares a reference signal determined from the ramp signal with the ramp signal to generate a clock signal and a negative or positive value of offset components included in the reference signal or the ramp signal is changed during every operating period of the switch device.

The control unit may include: a phase shift circuit outputting the clock signal; and a control signal generation circuit generating a control voltage based on the voltage pulse signal and the clock signal.

The control signal generation circuit may determine a level of the control signal from a phase difference between the clock signal and the voltage pulse signal.

The control signal generation circuit may increase the level of the control signal when a phase of the voltage pulse signal generated from the current flowing in the inductor included in the sub circuit is earlier than that of the clock signal, and reduce the level of the control signal when the phase of the voltage pulse signal generated from the current flowing in the inductor included in the sub circuit is later than that of the clock signal.

The detection circuit unit may generate the voltage pulse signal using a zero point crossing method.

The driving circuit unit may include: a ramp generation unit generating a first ramp voltage having a fixed slope and a second ramp voltage having a variable slope from the control signal; a comparison circuit unit comparing the first ramp voltage and the second ramp voltage with a predetermined reference voltage; and a flip-flop generating driving signals for switches included in the main circuit and the sub circuit, respectively, based on the output of the comparison circuit unit and the voltage pulse signal.

The comparison circuit unit may compare an output voltage of at least one of the main circuit and the sub circuit with a band gap reference (BGR) voltage to generate the reference voltage.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Figure 1:
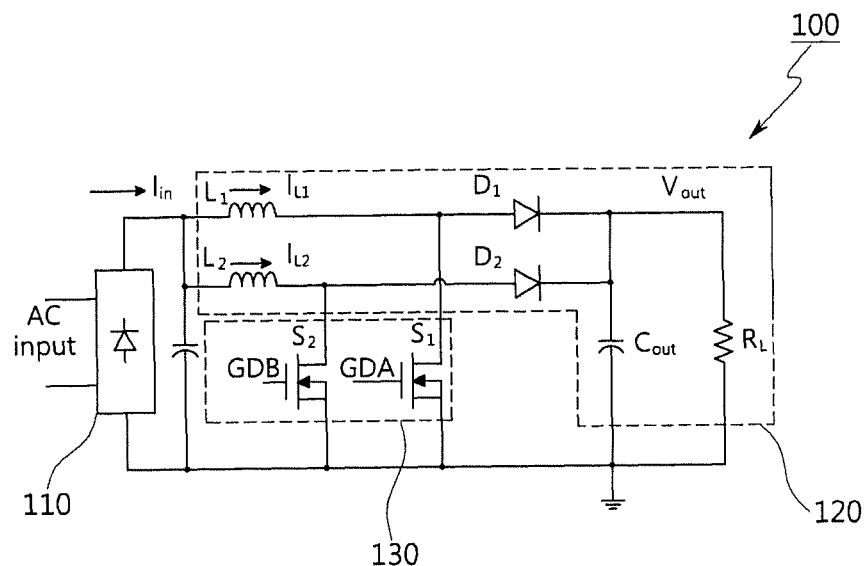
FIG. 1 is a block diagram schematically illustrating a power factor correction circuit according to an embodiment of the present invention.

FIG. 1 is a circuit diagram schematically illustrating a power factor correction circuit according to an embodiment of the present invention.

Referring to FIG. 1, a power factor correction circuit (PFC) 100 according to an embodiment of the present invention may include a rectifying unit 110 receiving and rectifying AC power, a power factor correction unit 120 including inductors $L_1$ and $L_2$ connected to each other in parallel, a resistor $R_L$, and a capacitor $C_{OUT}$, and a switch unit 130 controlling an operation of circuits connected to each other in parallel. The switch unit 130 may control current flowing in the inductors $L_1$ and $L_2$ and switch devices $S_1$ and $S_2$ are respectively turned on or off by gate driving signals GDA and GDB.

FIG. 1 illustrates one resistor $R_L$ and one capacitor $C_{OUT}$ for convenience sake, but similar to the inductors $L_1$ and $L_2$, the resistor and the capacitor may be also divided into two elements connected to each other in parallel. That is, the power factor correction circuit 100 illustrated in FIG. 1 may be an interleaving power factor correction circuit in which two same circuits are connected to each other in parallel in a master-slave scheme. In the present embodiment, the two power factor correction circuits are connected to each other in parallel, and therefore, a ripple component and electromagnetic interference of an input current $I_{in}$ may be significantly reduced when the gate driving signals GDA and GDB controlling operations of respective circuits have a phase difference of 360/2, 180°.

In order to significantly reduce the ripple component and the electromagnetic interference of the input current $I_{in}$, the power factor correction circuit 100 may have a phase shift circuit included in a control unit generating the gate driving signals GDA and GDB. The phase shift circuit may keep the phase difference between the gate driving signals GDA and GDB at 180°, and to this end, may detect current flowing in the respective inductors $L_1$ and $L_2$ and may receive the current converted into voltage. Hereinafter, a circuit configuration of setting the phase difference between the gate driving signals GDA and GDB to a required value and an operation method thereof will be described with reference to FIGS. 2 through 5.

Figure 2:
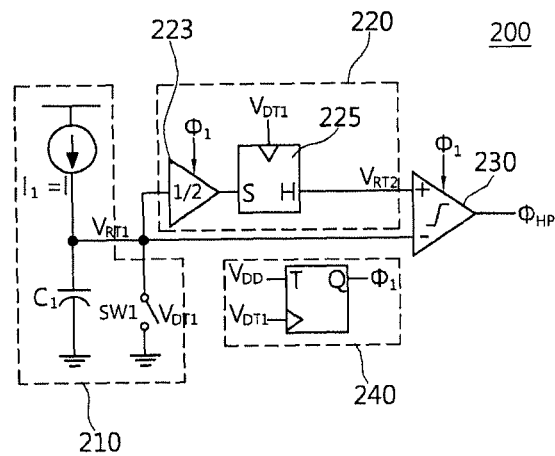
FIG. 2 is a circuit diagram illustrating an example of a phase shift circuit according to an embodiment of the present invention.

FIG. 2 is a circuit diagram illustrating an example of a phase shift circuit according to an embodiment of the present invention.

Referring to FIG. 2, a phase shift circuit 200 according to the embodiment of the present invention may include a ramp generation unit 210 including a current source $I_1$, a capacitor C1, and a switch device SW1, a reference signal generation unit 220, and a comparison unit 230. A configuration of the phase shift circuit 200 according to the embodiment of the present invention will first be described with reference to FIGS. 2 and 3 and an operation of the phase shift circuit 200 will be described below with reference to FIG. 4.

The ramp generation unit 210 includes the current source $I_1$, the capacitor C1, and the switch device SW1. An operation of the switch device SW1 is controlled by a voltage signal $V_{DT1}$ which may be a voltage pulse signal generated from current flowing in the inductor $L_1$ included in the power factor correction circuit 100 to which the phase shift circuit 200 according to the embodiment of the present invention is applied. The switch device SW1 is closed and a charge charged in the capacitor C1 is discharged while the voltage signal $V_{DT1}$ has a high level, and when the voltage signal $V_{DT1}$ has a low level, the switch device SW1 is open and a charge is charged in the capacitor C1.

Therefore, voltage $V_{RT1}$ of the capacitor C1 has a ramp signal form through reflecting characteristics of the capacitor C1 charged or discharged over time. The ramp signal $V_{RT1}$ is input to a non-inverting terminal of the comparison unit 230 and is transferred to the reference signal generation unit 220 to determine a reference signal $V_{RT2}$ applied to an inverting terminal of the comparison unit 230.

The reference signal generation unit 220 may include a reference level detection unit 223 and a sample and hold circuit 225. The reference level detection unit 223 may detect a peak value of the ramp signal $V_{RT1}$ increasing or decreasing over time and determine half of the detected peak value as a reference level. The level corresponding to half of the peak value of the ramp signal $V_{RT1}$ detected by the reference level detection unit 223 is transferred, as the reference signal $V_{RT2}$, to an inverting terminal of the comparison unit 230 through the sample and hold circuit 225.

The comparison unit 230 compares the reference signal $V_{RT2}$ transferred to the non-inverting terminal with the ramp signal $V_{RT1}$ transferred to a inverting terminal. Since the capacitor C1 is discharged while the switch device SW1 is closed, the voltage level of the ramp signal $V_{RT1}$ drops to 0, and when the switch device SW1 is open, the capacitor is re-charged by the current source $I_1$. Since the current source $I_1$ supplies a constant current, the ramp signal $V_{RT1}$ is increased with a constant slope. Therefore, the comparison unit 230 has a low level for T/2 within the operating period T of the switch device SW1 and outputs a clock signal $\Phi_{HP}$ having a high level for T/2.

However, the above description corresponds to an ideal case, and therefore when the offset component is included in the signal input to the comparison unit 230, the period for which the clock signal $\Phi_{HP}$ output from the comparison unit 230 has a high level deviates at T/2. For example, when the offset component having a positive (+) value is included in the reference signal $V_{RT2}$, since the period for which the $V_{RT1}$ has a larger value than the $V_{RT2}$ is relatively reduced, the period for which the clock signal $\Phi_{HP}$ has a high level is smaller than T/2. To the contrary, when the off set component having a negative (−) value is included in the reference signal $V_{RT2}$ the period for which the clock signal $\Phi_{HP}$ has a high level is larger than T/2.

In order to solve the above-mentioned problems, in the embodiment of the present invention, the input signal including the offset component having different signs in every period T of the switch device SW1 is applied to the comparison unit 230 or the reference signal generation unit 220. That is, when the reference signal $V_{RT2}$ including the offset component having a positive (+) value at a specific period is input to the comparison unit 230, the reference signal $V_{RT2}$ including the offset component having a negative (−) value is input to the comparison unit 230 at a next period, and the reference signal $V_{RT2}$ including the offset component having a positive (+) value is input to the comparison unit 230 at a next period. In this case, the clock signal $\Phi_{HP}$ having a high level cannot be generated for the exact T/2 period within one period, but errors are offset due to the offset component within the time including a large number of periods, and therefore, overall, the clock signal keeping a phase difference of 180° may be output.

For the foregoing operations, according to the embodiment of the present invention, a circuit of changing a negative or positive value of offset component, for example, a chopping circuit is included in at least one of the reference signal generation unit 220 and the comparison unit 230. Referring to FIG. 2, the circuit may be simply implemented as a T flip-flop 240 that is operated by a voltage pulse signal $V_{DT1}$ controlling a turning on and turning off of the switch device SW1. The T flip-flop 240 illustrated in FIG. 2 transmits VDD as an output signal $\Phi_1$ every time a pulse is detected at the voltage pulse signal $V_{DT1}$. Therefore, the negative or positive value of the offset component may be changed every time the switch device SW1 is triggered.

Figure 3:
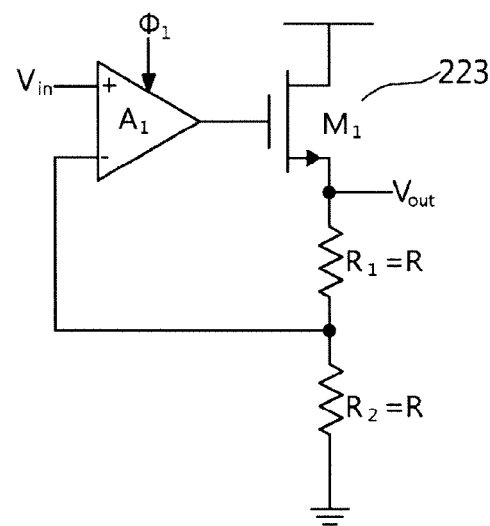
FIG. 3 is a circuit diagram illustrating a configuration example of a reference level detection unit included in the phase shift circuit illustrated in FIG. 2.

FIG. 3 is a circuit diagram illustrating a configuration example of a reference level detection unit included in the phase shift circuit illustrated in FIG. 2.

Referring to FIG. 3, the reference level detection unit 223 according to the embodiment of the present invention includes an amplification device A1, a switch device M1, and resistors $R_1$ and $R_2$ having the same value. When the voltage $V_{RT1}$ of the capacitor C1 generated by the ramp generation unit 210 is transferred as the input voltage $V_{in}$, the reference level detection unit 223 compares the output voltage $V_{OUT}$ divided by the resistors $R_1$ and $R_2$ with the input voltage $V_{in}$. In this case, for the offset component correction, the chopping circuit changing a negative or positive value of the offset component may also be applied to the amplification device A1 of the reference level detection unit 223.

Figure 4:
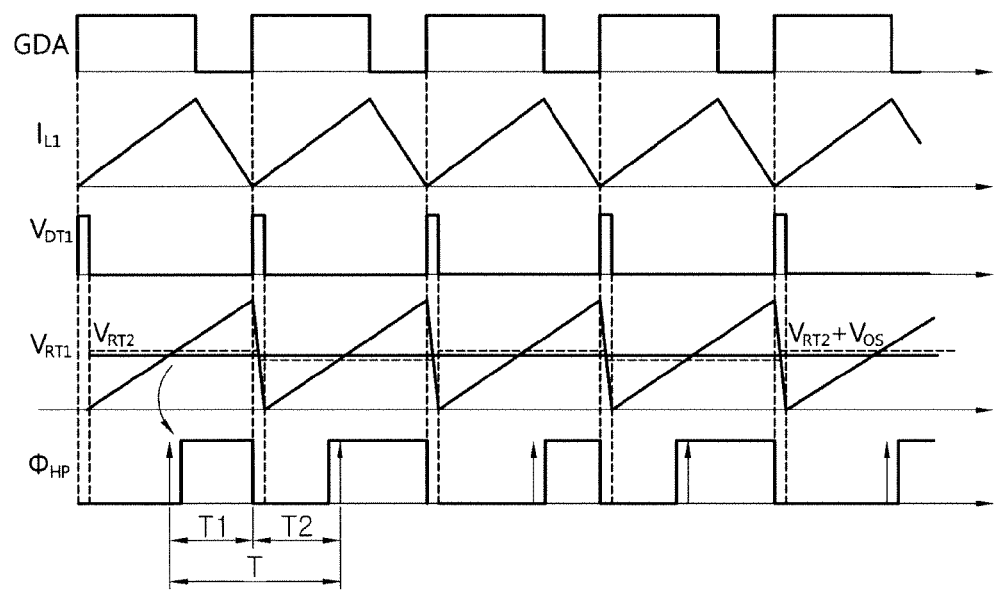
FIG. 4 is a timing diagram illustrating an operation of the phase shift circuit illustrated in FIG. 2.

FIG. 4 is a timing diagram illustrating an operation of the phase shift circuit illustrated in FIG. 2.

FIG. 4 illustrates the driving signal GDA controlling the turning on and turning off of the switch $S_1$ included in the power factor correction circuit 100 and the current $I_{L1}$ flowing in the inductor L1 of the power factor correction circuit 100. As described above, the voltage pulse signal $V_{DT1}$ controlling the operation of the switch device SW1 of the phase shift circuit 200 may be generated by detecting the zero point crossing of the current $I_{L1}$ flowing in the inductor. Therefore, all of the driving signal GDA, the current $I_{L1}$ flowing in the inductor, and the voltage pulse signal $V_{DT1}$ have the same period T.

When the voltage pulse signal $V_{DT1}$ is at a high level, the switch device SW1 is closed and the charge charged in the capacitor C1 is discharged. When the voltage pulse signal $V_{DT1}$ returns to a low level by passing through a short period, the switch device SW1 is open and the capacitor C1 is charged by the current source $I_1$. Since a constant current is supplied by the current source $I_1$, the voltage $V_{RT1}$ of the capacitor C1 has a ramp signal form increasing at a constant slope.

The comparison unit 230 compares the ramp signal $V_{RT1}$ with the reference signal $V_{RT2}$ corresponding to half of the peak value. The offset component $V_{OS}$ may be included in the reference signal $V_{RT2}$ and the present embodiment performs a control to change a negative or positive value of the offset component $V_{OS}$ in every period of the switch device SW1 by adding a chopping circuit, or the like, to the phase shift circuit 200, instead of artificially removing the offset component.

Reviewing the timing diagram of FIG. 4, the offset component $V_{OS}$ has a positive (+) sign at an odd numbered period and the offset component $V_{OS}$ has a negative (−) sign at an even numbered period. Therefore, the period for which the clock signal $\Phi_{HP}$ has a high level is shorter than T/2 in an odd-numbered period, and the period for which the clock signal $\Phi_{HP}$ has a high level is longer than T/2 in an even numbered period. Consequently, it may be difficult to accurately fit the phase difference between the gate driving signals GDA and GDB into 180° within one period, but the offset components $V_{OS}$ are offset from each other within the time including many periods to fit the phase difference between the GDA and the GDB into 180°.

Figure 5:
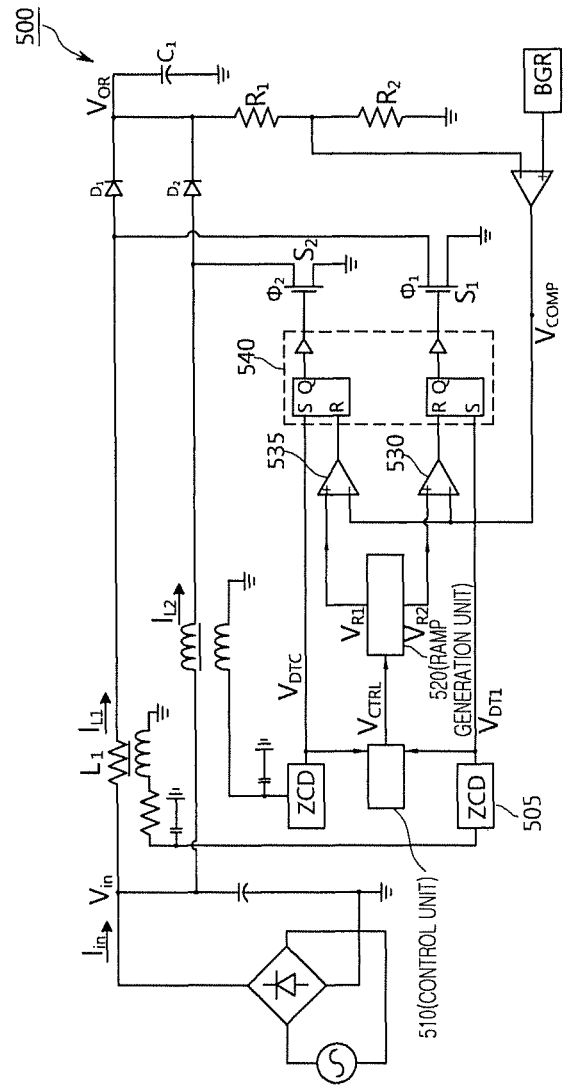
FIG. 5 is a circuit diagram illustrating an example of a phase shift circuit according to another embodiment of the present invention.

FIG. 5 is a circuit diagram illustrating an example of a phase shift circuit according to another embodiment of the present invention.

Referring to FIG. 5, the overall configuration of the power factor correction circuit 500 according to the present embodiment is similar to the power factor correction circuit 100 illustrated in FIG. 1. The power factor correction circuit has an interleaving structure in which two power factor correction circuits are connected to each other in parallel, and the switches $S_1$ and $S_2$ controlling the operations of each power factor correction circuit are turned on and turned off by the gate driving signals GDA and GDB. For convenience of explanation, the power factor correction circuit including the inductor $L_1$ and the switch $S_1$ may be illustrated as a main circuit and the power factor correction circuit including the inductor $L_2$ and the switch $S_2$ may be depicted as a sub circuit. That is, the main circuit including the inductor $L_1$ and the switch $S_1$ is operated in a free running manner, independent of the operation of the sub circuit.

The current flowing in the inductors $L_1$ and $L_2$ is detected by a zero point crossing method and the voltage pulse signals $V_{DT1}$ and $V_{DT2}$ are generated. The voltage pulse signals $V_{DT1}$ and $V_{DT2}$ generated from the current flowing in the inductor are transferred to a control unit 510 which outputs a control signal $V_{CTRL}$. The control signal $V_{CTRL}$ may be understood as being the same as an output control signal described in FIG. 4, that is, the control unit 510 may include a phase shift circuit. The control signal $V_{CTRL}$ is transferred to a ramp generation unit 520 and the ramp generation unit 520 may generate the first ramp signal $V_{R1}$ and the second ramp signal $V_{R2}$.

The ramp signal $V_{R1}$ and the second ramp signal $V_{R2}$ have a predetermined slope, for example, the first ramp signal $V_{R1}$ may have a fixed slope and the second ramp signal $V_{R2}$ may have a variable slope. In this case, the slope of the second ramp signal $V_{R2}$ may be determined according to the level of the control signal $V_{CTRL}$.

The first ramp signal $V_{R1}$ and the second ramp signal $V_{R2}$ are input to comparators 530 and 535 and compared with a reference signal $V_{COMP}$. The reference signal $V_{COMP}$ is a signal obtained by comparing the output voltage of the power factor correction circuit with a band gap reference (BGR) signal. In the operation of the main circuit, the gate driving signal GDA is determined by comparing the $V_{COMP}$ with the first ramp signal $V_{R1}$ and according to the large and small relationship. The gate driving signal GDA is in a low level, such that when the switch $S_1$ is turned-off, the current flowing in the inductor $L_1$ is reduced. When the current flowing in the inductor $L_1$ is reduced to 0, a pulse is generated in the voltage pulse signal $V_{DT1}$ by the current detection unit 505 and an RS flip-flop 540 outputs a high-level output signal. As such, the main circuit performs a free running operation, independent of the operation of the sub circuit.

On the other hand, the gate driving signal GDB determining the operation of the sub circuit is determined by the ramp signal $V_{R2}$ having a variable slope. The ramp signal $V_{R2}$ is determined according to a level of the control signal $V_{CTRL}$ and the level of the control signal $V_{CTRL}$ is controlled by the reference clock signal $\Phi_{HP}$ output from the phase shift circuit included in the control unit 510. In addition, the reference clock signal $\Phi_{HP}$ is determined based on the voltage pulse signal $V_{DT1}$ according to the current flowing in the inductor $L_1$ of the main circuit, such that the operation of the sub circuit is affected by the main circuit. Hereinafter, the operation of the sub circuit and the operation of controlling the phase of the gate driving signal GDB will be described with reference to a timing diagram of FIG. 6.

Figure 6:
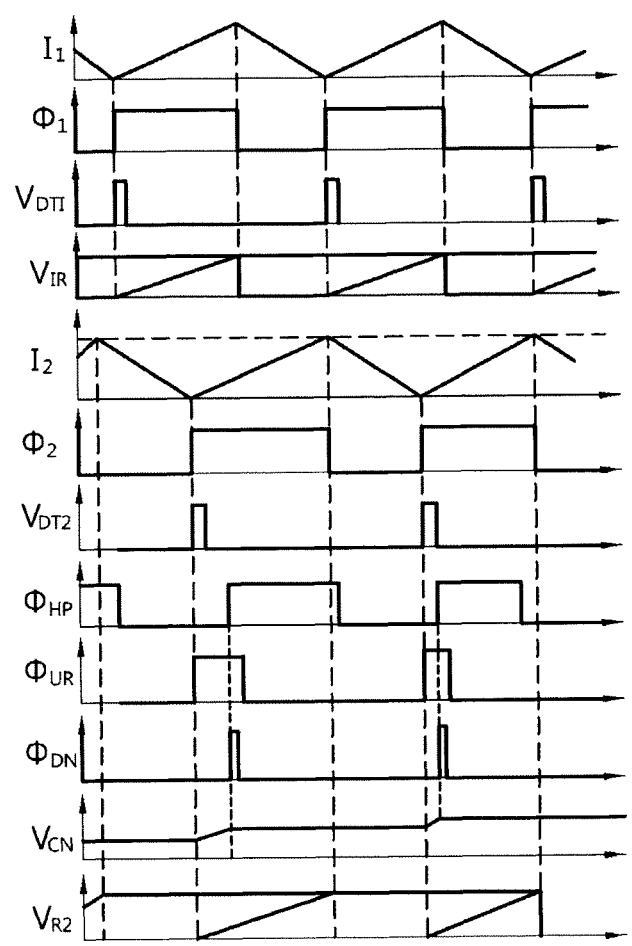
FIG. 6 is a timing diagram illustrating an operation of the phase shift circuit illustrated in FIG. 5.

FIG. 6 is a timing diagram illustrating an operation of the phase shift circuit illustrated in FIG. 5. First, the phase shift circuit of the control unit 510 receives the voltage pulse signal $V_{DT1}$ determined from the current flowing in the inductor $L_1$ of the main circuit, as an input signal, as illustrated in FIGS. 2 through 4. Further, as illustrated in the timing diagram of FIG. 4, the phase of the reference clock signal $\Phi_{HP}$ has a difference of 180° from the voltage pulse signal $V_{DT1}$.

First, it is assumed that the phase of the voltage pulse signal $V_{DT2}$ is earlier than that of the reference clock signal $\Phi_{HP}$. Referring to the control circuit unit 410 illustrated in FIG. 4, in an output signal of a D flip flop, $\Phi_{DN}$ has a low level and $\Phi_{UP}$ has a high level. Therefore, current is supplied from a current source $I_{UP}$, such that the level of the control signal $V_{CTRL}$ is increased and the ramp generation unit 520 lowers the slope of the second ramp signal $V_{R2}$. That is, the second ramp signal $V_{R2}$ is being more slowly increased.

Since the second ramp signal $V_{R2}$ is slowly increased, the comparator 535 compares the second ramp signal $V_{R2}$ with the reference signal $V_{COMP}$, and outputs a low-level signal for a long period of time, such that the gate driving signal GDB keeps a high level for a long period of time and the turn-on time of the switch $S_2$ is long. Therefore, as illustrated in the timing diagram of FIG. 6, rising timings of the reference clock signal $\Phi_{HP}$ and the voltage pulse signal $V_{DT2}$ approximate each other at a next period, such that the rising timings of two signals coincide with each other by repeating the above processes.

To the contrary, when the phase of the voltage pulse signal $V_{DT2}$ is later than that of the reference clock signal $\Phi_{HP}$, differently from the foregoing case, the $\Phi_{DN}$ from the output signal of the D flip-flop of the control circuit unit 410 has a high level and the $\Phi_{UP}$ has a low level. Therefore, the level of the control signal $V_{CTRL}$ is reduced and the slope of the second ramp signal $V_{R2}$ is increased, such that the turn-on time of the switch $S_2$ is short. The rising timings of the two signals may coincide with each other by repeating the operation several times.

As set forth above, according to the embodiments of the present invention, the phase shift circuit may accurately generate the phase difference between the signals driving the plurality of circuits included in the interleaved type power factor correction circuit using the single current source, as a value of 360/n (n is the number of power factor correction circuits connected to each other in parallel). Therefore, the signal having the required phase difference may be accurately generated without causing side effects due to the mismatch of current to be considered at the time of using the plurality of current sources. Further, the ripple component of an input current of the power factor correction circuit may be reduced and the electromagnetic interference (EMI) of the input and output signals may be significantly reduced.

While the present invention has been shown and described in connection with the embodiments, it will be apparent to those skilled in the art that modifications and variations may be made without departing from the spirit and scope of the invention as defined by the appended claims.

What is claimed is:

1. A phase shift circuit, comprising:
   a ramp generation unit charging or discharging a capacitor connected to a switch device to generate a ramp signal;
   a reference signal generation unit generating a predetermined reference signal from the ramp signal; and
   a comparison unit comparing the ramp signal with the reference signal to generate a clock signal,
   wherein at least one of the reference signal generation unit and the comparison unit changes a negative or positive value of offset components included in the reference signal or the ramp signal within every operating period of the switch device.

2. The phase shift circuit of claim 1, wherein the reference signal generation unit includes:
   a reference level detection unit detecting half of a peak value of the ramp signal; and
   a sample and hold circuit sampling the reference level and transferring the sampled reference level to a non-inverting terminal of the comparison unit.

3. The phase shift circuit of claim 2, wherein at least one of the reference level detection unit and the comparison unit changes a negative or positive value of the offset components included in the reference signal or the ramp signal within every operating period of the switch device.

4. The phase shift circuit of claim 1, wherein the operating period of the switch device is determined by current flowing in an inductor of a power factor correction circuit operated by a clock signal output by the comparison unit.

5. The phase shift circuit of claim 4, wherein the current flowing in the inductor is detected by a zero point crossing method.

6. The phase shift circuit of claim 1, wherein the comparison unit generates the clock signal so that an average value of a turn-on time of the clock signal within one period corresponds to a half value of one period of the clock signal.

7. A power factor correction circuit, comprising:
   a detection circuit unit detecting current flowing in inductors included in a main circuit and a sub circuit, respectively, to generate a voltage pulse signal;
   a control unit operating a switch device during every period of the voltage pulse signal to charge and discharge a capacitor and generate a control signal; and
   a driving circuit unit determining operations of switches included in the main circuit and the sub circuit, respectively, based on the control signal and the voltage pulse signal,
   wherein the control unit charges and discharges the capacitor to generate a ramp signal and compares a reference signal determined from the ramp signal with the ramp signal to generate a clock signal, and a negative or positive value of offset components included in the reference signal or the ramp signal is changed during every operating period of the switch device.

8. The power factor correction circuit of claim 7, wherein the control unit includes:
   a phase shift circuit outputting the clock signal; and
   a control signal generation circuit generating a control voltage based on the voltage pulse signal and the clock signal.

9. The power factor correction circuit of claim 8, wherein the control signal generation circuit determines a level of the control signal from a phase difference between the clock signal and the voltage pulse signal.

10. The power factor correction circuit of claim 9, wherein the control signal generation circuit increases the level of the control signal when a phase of the voltage pulse signal generated from the current flowing in the inductor included in the sub circuit is earlier than that of the clock signal, and
   reduces the level of the control signal when the phase of the voltage pulse signal generated from the current flowing in the inductor included in the sub circuit is later than that of the clock signal.

11. The power factor correction circuit of claim 8, wherein the detection circuit unit generates the voltage pulse signal using a zero point crossing method.

12. The power factor correction circuit of claim 7, wherein the driving circuit unit includes:
   a ramp generation unit generating a first ramp voltage having a fixed slope and a second ramp voltage having a variable slope from the control signal;
   a comparison circuit unit comparing the first ramp voltage and the second ramp voltage with a predetermined reference voltage; and
   a flip-flop generating driving signals for switches included in the main circuit and the sub circuit, respectively, based on the output of the comparison circuit unit and the voltage pulse signal.

13. The power factor correction circuit of claim 12, wherein the comparison circuit unit compares an output voltage of at least one of the main circuit and the sub circuit with a band gap reference (BGR) voltage to generate the reference voltage.

* * * * *